United States Patent [19]

Benter

[11] Patent Number: 4,735,037

[45] Date of Patent: Apr. 5, 1988

[54] QUICK DETACHABLE AUXILIARY BLOWER FOR MOWER DECK

[75] Inventor: Dean W. Benter, Horicon, Wis.

[73] Assignee: Deere & Company, Moline, Ill.

[21] Appl. No.: 885,366

[22] Filed: Jul. 14, 1986

[51] Int. Cl.[4] .................. A01D 34/70; A01D 87/10
[52] U.S. Cl. .................................. 56/13.3; 56/202; 56/16.6
[58] Field of Search ............... 56/12.8, 13.3, 16.6, 56/202, 13.9, 60, 61; 241/101.7, 47, 202, 83; 406/38, 39

[56] References Cited

U.S. PATENT DOCUMENTS

| | | |
|---|---|---|
| 3,143,842 | 8/1964 | Mattson et al. ............... 56/202 |
| 3,494,116 | 2/1970 | Lempke ........................ 56/202 |
| 3,499,275 | 3/1970 | Lozen ........................... 56/202 |
| 3,618,157 | 11/1971 | Bassin .......................... 56/202 |
| 3,716,977 | 2/1973 | Jackson ........................ 56/202 |
| 3,822,536 | 7/1974 | Leader ......................... 56/202 |
| 3,925,968 | 12/1975 | Wagenhals .................... 56/13.3 |
| 3,934,392 | 1/1976 | Moery et al. .................. 56/202 |
| 4,158,279 | 6/1979 | Jackson ........................ 56/202 |
| 4,168,600 | 9/1979 | Klug et al. .................... 56/202 |
| 4,345,416 | 8/1982 | Cameron ...................... 56/13.3 |
| 4,393,645 | 7/1983 | Moore .......................... 56/202 |
| 4,614,080 | 9/1986 | Hoepfuer et al. .............. 56/16.6 |

FOREIGN PATENT DOCUMENTS 2503380 10/1975 Fed. Rep. of Germany ....... 56/13.9

OTHER PUBLICATIONS

Koehring Farm Division, pamphlet, Fox, No. 1778-30M769.

Primary Examiner—John Weiss

[57] ABSTRACT

In a mower deck and auxiliary blower combination in which the mower deck has a side discharge and the blower has a housing with an inlet in communication with the discharge, an elongated horizontal socket is provided on the deck and a matching rod dimensioned closely to mate with the socket is fixed on the blower so that when the rod is inserted in the socket, the housing will be supported in cantilever fashion on the mower deck. Offset from the socket and matching rod joint is a shoulder on the mower deck that underlies a shoulder on the housing and a verticle pin extends through the portion of the housing and the portion of the deck at said shoulders and detachably connects the housing end to the deck. Removal of the pin makes removal of the entire blower a mere sliding action as the rod is moved outwardly from its socket.

9 Claims, 3 Drawing Sheets

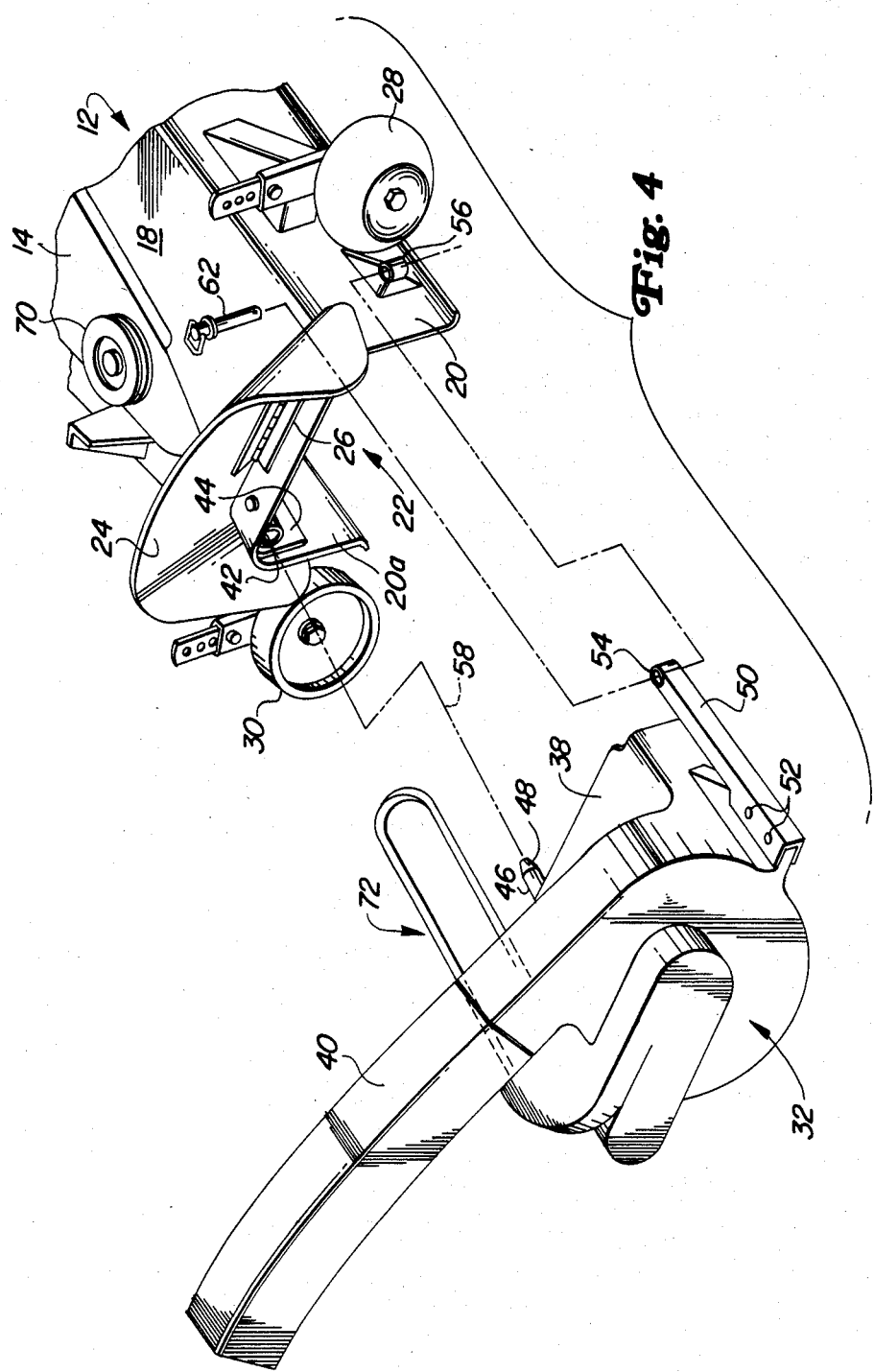

QUICK DETACHABLE AUXILIARY BLOWER FOR MOWER DECK

BACKGROUND OF THE INVENTION

The present invention relates to an auxiliary blower adapted for attachment to a lawn mower and which serves the purpose of directing clippings from the mower to a bag or other type of receptacle. More specifically, the present invention relates to a quick attach and detach mounting arrangement which mounts the blower on the side of the mower deck.

It is well known to provide lawn mowers with clipping collectors including duct work which leads from the mower to the receptacle. Normally, the mower is mounted on the underside of a tractor, the receptacle is mounted on the rear of the tractor and the duct work extends from a side of the mower upwardly and rearwardly for discharge into the upper end of the receptacle. It is also common, in many mowers, to not have the receptacle and duct work and consequently, deflector panels are used on the outboard side of the mower for reflecting the mower clippings onto the ground. Often, this latter type of mower is of the larger size, having three or more cutting blades, so that it generates such a quantity of clippings that the blades themselves cannot impel or blow the clippings through the duct work to a receptacle. Such a mower may utilize an auxiliary blower that is mounted on the side of the mower deck and which receives the clippings and impels or blows them upwardly into the receptacle. Such an arrangement is disclosed in U.S. Pat. No. 4,193,249 which issued to Tacket on Mar. 18, 1980. Another system is disclosed in U.S. Pat. No. 4,095,398 which issued to Aumann et al on June 20, 1978.

The auxiliary blower arrangement described in the aforementioned patents creates a basic problem of how to mount and dismount the auxiliary blowers on the mower deck. Often, it is desirable, even when an auxiliary blower is available, to completely remove the blower and the receptacle from the tractor and to permit the grass clippings to move onto the ground. Such a time may occur in the latter part of the summer when grass clippings are not extremely heavy or long and it is preferable to place them back on the ground rather than to collect them and have the problem of discarding the clippings. Therefore, a problem does exist by having the auxiliary blower mounted rigidly with the mower deck unless it can be quickly removed from and mounted on the mower deck. Consequently, this takes considerable structure and attaching means which is not only costly but creates a problem of time when it is desired to mount or dismount the auxiliary blower.

SUMMARY OF THE INVENTION

With the above in mind, it is a primary object of the present invention to provide a simple quick attachable and detachable mounting arrangement between the auxiliary blower and the mower deck which rigidly mounts the blower on the deck in cantilever fashion.

More specifically, it is the purpose of the present invention to provide a mounting arrangement between the auxiliary blower and the mower deck which is composed, in part, of a horizontal socket and matching rod, one being mounted on the mower deck and the other on the blower housing, and which have transverse dimensions to them so that the blower housing is supported generally in cantilever fashion from the mower deck.

Also connecting the housing to the deck is a vertical pin that extends through openings in the mower deck and blower housing, the openings being registrable only when the blower is properly positioned on the socket and in its receiving position with respect to the deck. When the pin is received in both of the openings, the blower cannot swing laterally about the axis of the pin since the rod and its socket will prevent swinging action. The pin connecting the two parts is, of course, detachable, and by merely removing it, the rod may be removed from the socket and the entire blower housing removed from the deck.

BRIEF DESCRIPTION OF THE DRAWINGS

FIG. 4 is an exploded perspective view showing portions of the blower housing and the mower deck in a separated condition.

DESCRIPTION OF THE PREFERRED EMBODIMENT

Figure 1:
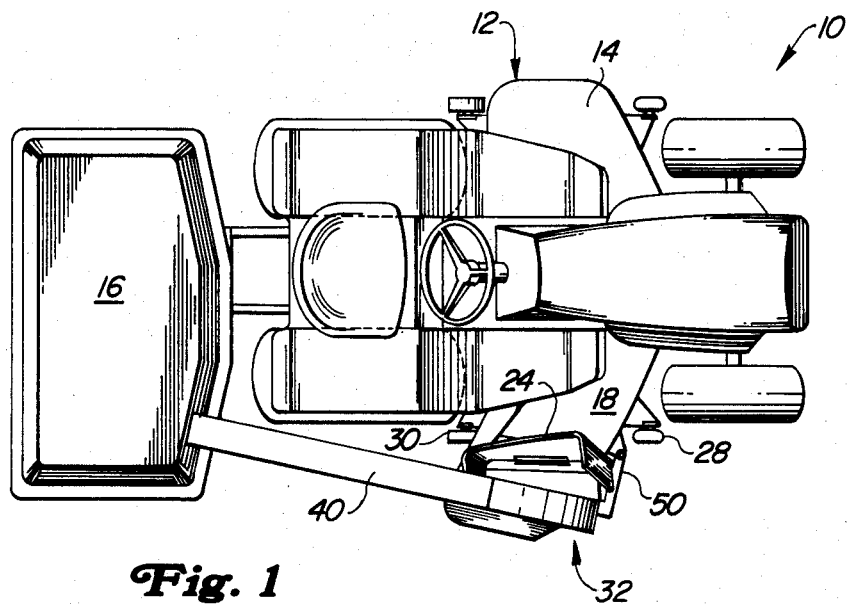
FIG. 1 is a plan view of a tractor, a tractor-mounted mower and receptacle, and an auxiliary blower and its attachment means which are the subject of the present invention.
Figure 2:
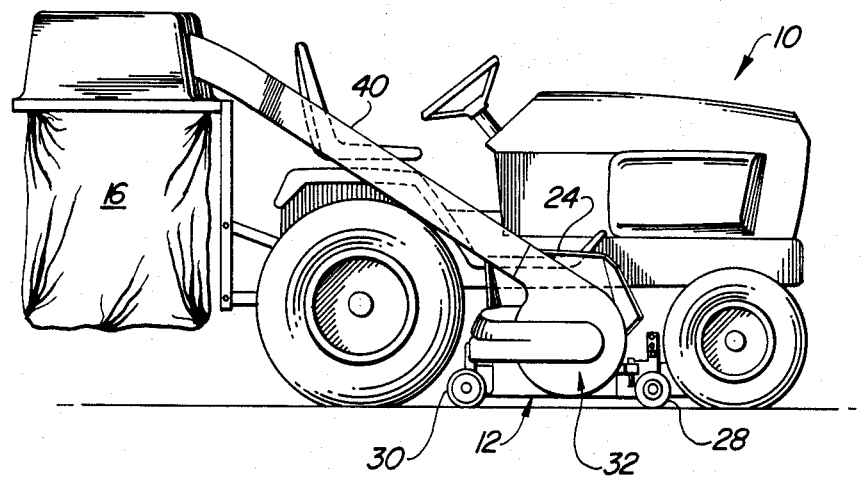
FIG. 2 is a side view of the structure shown in FIG. 1.

Referring now to the drawings, there is shown a tractor 10 having a mower 12 suspended therebeneath with a mower deck 14. A bagging attachment 16 is supported on the rear end of the tractor for receiving material discharged by the mower.

The receptacle 16 is carried on the rear of the tractor by means of a 3-point hitch connection and, as is conventional on such 3-point hitch connections, lends itself for easy detachment and attachment to the tractor. The mower 12 is a comparatively large mower, being composed of three spindles and their associated blades, and which generate a considerable amount of clippings. The mower deck 14 is composed of an overhead wall 18 and a depending skirt 20 that extends around the edge and downwardly from the wall 18 and serves to guide and diffuse the clippings into a side discharge outlet indicated at 22. The outlet 22 is generally U-shaped in cross section being formed by a portion of the overhead wall 18, a portion of the skirt 20 on the front, and a skirt extension 20a on the rear.

A grass deflector panel 24 is pivotally mounted by hinge 26 so as to swing vertically. The deflector 24 normally, when the blower attachment is not mounted on the mower deck, faces downwardly and deflects the grass clippings onto the ground. Wheels, such as at 28, 30, are provided on the mower and generally guage the mower on the ground, although some suspension means is normally provided between the tractor and mower deck.

A blower or impellor attachment 32 is provided outboard of the mower deck 14 and is positioned to receive materials from the outlet 22. The blower attachment 32 includes an impellor, shown in dotted representation at 34 in FIG. 3, and an impellor housing 36 formed about the impellor 34. The housing 36 has an inlet tunnel 38 conforming in shape to the portions of the walls 18, 20, 20a forming the outlet 22. When mounted, the blower 32 and its tunnel 38 telescopes slightly over the edges of the mower deck at the outlet. The tunnel 38 opens into the side of the impellor and consequently, as material is discharged through the outlet 22 and into the tunnel 38, it is picked up by the impellor and blown through a suitable duct structure 40 that leads upwardly and rearwardly to the receptacle 16.

Figure 3:
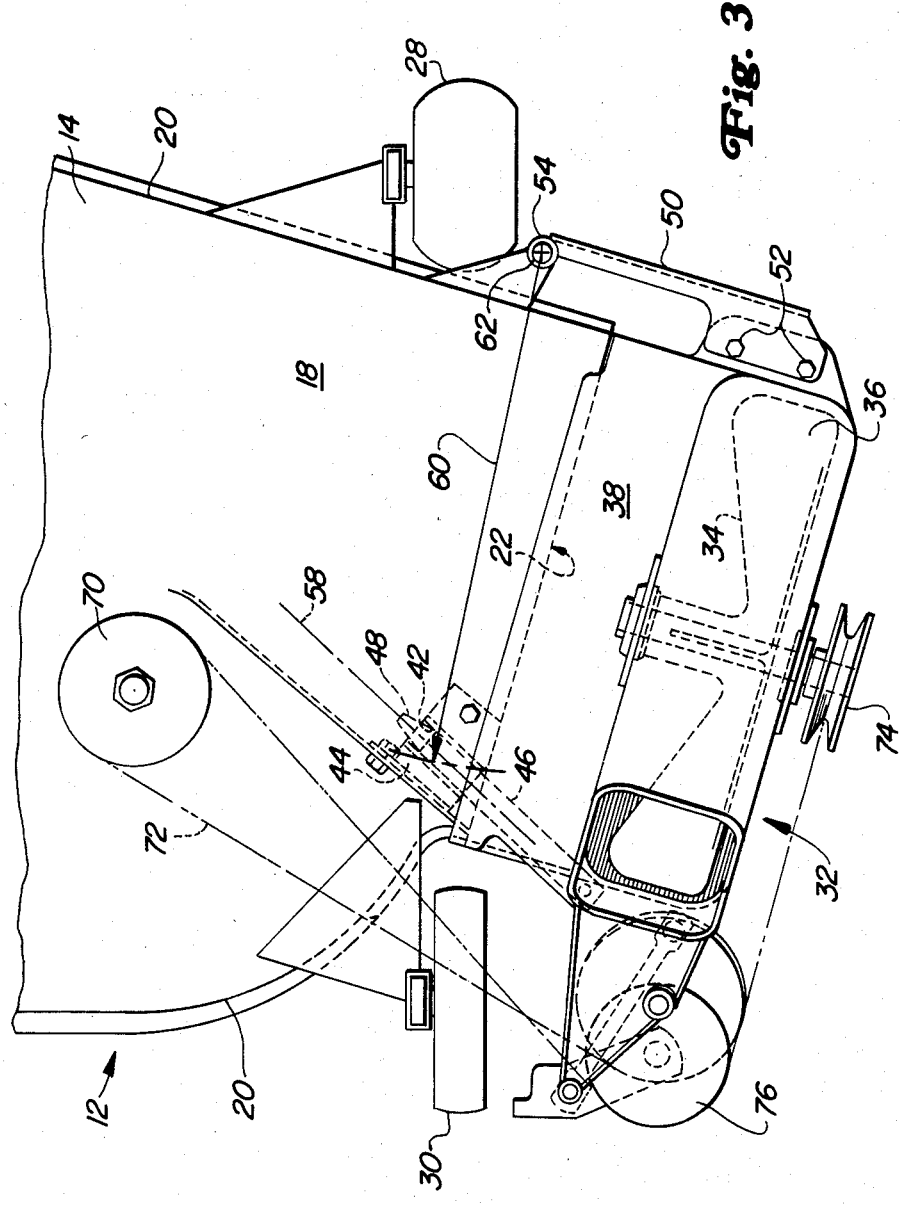
FIG. 3 is an enlarged plan view, showing the discharge portion of the mower deck and the blower attachment. For purposes of clarity the deflector panel and its hinge is not shown in this view.

Fixed to the mower deck 18 in the upper rear corner of the outlet 22 is a horizontal socket member 42. The socket member 42 is welded to an angle bracket 44 that has an upper horizontal leg fixed to the overhead wall 18 at the outlet and a vertical leg portion that is fixed to the skirt extension 20a at that part of the outlet. A mating horizontal rod 46 is fixed to and projects inwardly from the tunnel portion 38 of the housing 32. The rod 46 has a tapered end 48 which serves as a pilot for guiding the rod 46 into the socket 42. Referring to FIG. 4, it will be noted that the path of material leaving the outlet 22 will generally be in a rearward and outward direction. The axis of the rod 46 is generally parallel to the direction of the stream of the materials leaving the mower deck housing so as to limit its obstruction to the smooth flow of the material. Fixed to the housing 36 is a metal arm 50 that projects inwardly from the housing 36 and is fixed thereto by a pair of rivets 52. The housing 36 is composed of plastic and the arm 50 is made of metal so that a rigid mounting arrangement such as by the rivets 52 is required. The innermost end of the arm 50 is provided with a vertical socket or opening 54. The mower deck 14 has structure forming a mating vertical socket 56 mounted on and projecting forwardly from the front wall surface of the skirt 20 adjacent the outlet 22. Referring to FIGS. 3 and 4, it will be noted that the axis, indicated by the reference numeral 58, of the horizontal socket 42 and its matching rod 46 is generally at an angle to the mower deck 12 and blower tunnel 38. If a radius, shown by reference numeral 60, was struck from the vertical axis of the openings 54, 56 through a midportion of the socket 42, the axis 58 of the rod and socket would be at an oblique angle to the radius.

When mounting the blower 32 on the mower deck 14, the rod 46 is inserted into the socket 42 and the blower is moved along the axis 58 until the vertical socket 54 on arm 50 is in registry with the vertical socket formed in the structure 56. At this time, a pin 62 is inserted in the respective sockets so as to hold the entire blower 32 in cantilever fashion on the mower deck. Also, it should be noted the arm portion forming the socket 54 rests on a ledge or shoulder of the structure forming socket 56, so that the latter structure gives vertical support to the blower housing at its forward side. Since the axis 58 is oblique with respect to the radius 60, the tube or socket 42 will lock the rod 46 from movement in any direction other than about the axis 58. The vertical disposition of the sockets 54, 56 and their connecting pin 62, prevents such movement in this latter direction. Stating this in another way, so long as the pin 62 is not inserted, the blower 32 may be moved along the axis 58. However, once the pin 62 is inserted, the only movement the blower 32 could possibly have would be about the axis of the pin 62. However, the connection between the socket 42 and its pin 62 would prevent such movement. Therefore, the entire blower 32 is held rigidly with respect to the mower deck. When removing the blower 32 from the mower deck, it is only necessary to lift the pin 62 and to withdraw the rod 46 from its socket 42.

It should also be noted that the only time the pin 62 can be moved into both the vertical sockets 54, 56 on the blower housing and mower deck respectively occurs at the single position in which the blower housing is properly positioned with respect to the mower deck. Thus, there is not only provided a simple means of attaching and detaching the blower to and from the mower deck, there is also provided a simple system which forces the operator to properly position the blower on the mower deck.

The outermost vertical spindle has a belt pulley 70 fixed to its upper end and above the deck wall 18. A belt drive, indicated in its entirety by reference numeral 72 extends from the pulley 70 to an impellor drive pulley 74 on the outboard side of impellor 36, suitable directional pulleys, such as at 76, are provided on the rear portion of housing 36. It should, however, be understood that the specifics of the drive serve no part of the present invention and other designs of drive would suffice, other than to understand that the attachment between the blower and mower deck must uniformly and properly position the blower and mower deck in order to maintain proper operation of the belt drive.

I claim:

1. On a mower deck and auxiliary blower combination in which the mower deck has a side discharge and the blower has a housing with an inlet in communication with said discharge; an elongated horizontal socket and matching rod dimensioned closely to mate with one another, one being rigid with the mower deck and the other with the housing and effective to permit the housing to slide to and from a desired material-receiving position between said inlet and said side discharge; structure on the deck and housing providing vertical sockets respectively that are offset from the horizontal socket and matching rod and which are in vertical registry with one another when said housing is in said desired material-receiving position; and a detachable vertical pin extending through said vertical sockets preventing separation of the housing from the deck, said matching horizontal socket and rod and said vertical pin and its matching vertical sockets serving to provide cantilever support for said blower on the mower deck.

2. The invention defined in claim 1 wherein the axis of said horizontal socket and matching rod forms an oblique angle to a line extending between the vertical axis of said vertical pins and sockets and a midportion of said horizontal socket.

3. The invention defined in claim 1 wherein the structure providing the vertical socket on the mower deck has an upwardly facing surface and the structure providing the vertical socket on the housing has a downwardly facing surface that engages and rests on said upwardly facing surface.

4. The invention defined in claim 1 in which the structure forming the horizontal socket is rigid with the mower deck and the matching rod is rigid with and projects inwardly from the housing toward the deck.

5. On a mower deck and auxiliary blower combination in which the mower deck has a side discharge and the blower has a housing with an inlet in communication with said discharge; an elongated horizontal socket and matching rod dimensioned closely to mate with one another, one being rigid with the mower deck and the other with the housing and effective to permit the housing to slide to and from a desired material-receiving position between said inlet and said side discharge; a ledge on the deck offset from the socket and matching rod; a shoulder on the housing engaging the ledge and supporting a portion of the housing therein when the housing is in said desired material-receiving position; and a detachable connecting element extending between the ledge and housing at said shoulder, preventing separation of the housing from the deck at said shoulder and ledge and effective to prevent sliding action between said rod and socket when the housing is in said desired material-receiving position.

6. The invention defined in claim 5 in which the structure forming the ledge has a vertical socket and the structure forming the shoulder has a vertical socket in vertical registry with the aforesaid vertical socket, and the connecting element is a vertical pin that extends through said sockets.

7. The invention defined in claim 6 further characterized by the axis of the horizontal socket and matching rod being at an oblique angle to a line extending between the vertical axis of said vertical sockets and pin and through the horizontal socket.

8. A blower attachment for a tractor-mounted mower having a mower deck including an overhead wall and a skirt extending downwardly therefrom, and further having an outlet at one side for discharging clippings from the mower in a generally horizontal rearwardly and outwardly directed stream, said attachment comprising an impellor housing formed about an impellor with an inlet tunnel extending to and opening into one side of the impellor from an end portion in communication with said mower outlet, said tunnel being in telescoping relation to the overhead wall and skirt portions at said outlet; a horizontal rod fixed to the housing in the area of the rear side of the tunnel and projecting from the housing in general parallel relation to the stream of material; a horizontal socket mounted on the mower deck and axially aligned with and for receiving said rod to permit said tunnel to move horizontally along the axis of said socket and rod into a desired telescopic relation to the portion of the overhead wall and skirt adjacent said outlet; a vertical socket mounted on the mower deck at the forward side of said opening; structure on the blower housing at the forward part of the tunnel and having a vertical opening therein vertically registrable with said vertical socket when said tunnel is in said desired telescopic relation; and a removable vertical pin received in said vertical socket and said opening when in registry for holding the housing on said deck in said desired telescopic relation.

9. On a mower deck and auxiliary blower in which the mower deck has a side discharge and the blower has a housing with an inlet in communication with said discharge; an elongated horizontal socket and matching rod dimensioned closely to mate with one another, one being rigid with the mower deck and the other with the housing and effective to permit the housing to slide to and from a desired material-receiving position between said inlet and said side discharge; structure on the deck and housing providing vertical sockets respectively that are offset from the horizontal socket and matching rod and which are in vertical registry with one another when said housing is in said desired material-receiving position; a detachable vertical pin extending through said vertical sockets preventing separation of the housing from the deck, said matching horizontal socket and rod and said vertical pin and its matching vertical sockets serving to provide cantilever support for said blower on the mower deck; and a belt drive extending from a pulley on the deck to a blower drive pulley on the blower housing, said drive being in proper position to operate the blower when said housing is in the aforesaid desired material-receiving position.

* * * * *